Patented Mar. 2, 1954

2,671,096

UNITED STATES PATENT OFFICE 2,671,096

6β,17α,21-TRIHYDROXY-4-PREGNENE-3,20-DIONE AND ESTERS THEREOF

Herbert C. Murray, Hickory Corners, and Durey H. Peterson, Kalamazoo, Mich., assignors to The Upjohn Company, Kalamazoo, Mich., a corporation of Michigan No Drawing. Application July 1, 1952,
Serial No. 296,735

15 Claims. (Cl. 260—397.47)

This invention relates to new and useful compounds and more specifically to 6β,17α,21-trihydroxy-4-pregnene-3,20-dione and the carboxylic acid esters of 6β,17α,21-trihydroxy-4-pregnene-3,20-dione and to methods for the preparation thereof.

It is an object of this invention to provide the novel 6β,17α,21-trihydroxy-4-pregnene-3,20-dione and the mono- and di-esters of 6β,17α,21-trihydroxy-4-pregnene-3,20-dione having pharmacological and especially progestational activity and being additionally useful in the synthesis of various oxygenated steroids. Another object is to provide a process for the preparation of these new and useful compositions of matter. Other objects of the invention will be apparent to those skilled in the art to which this invention pertains.

The novel compounds of the present invention are represented by the following structural formula:

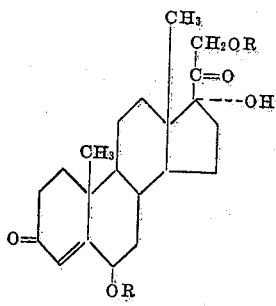

wherein R is a member selected from the group consisting of hydrogen and an acyl group of a carboxylic acid.

These compounds are useful as intermediates in the synthesis of pharmacologically active steroids. For example, on oxidation of 6β,21-diacetoxy-17α-hydroxy-4-pregnene-3,20-dione to 6β-acetoxy-4-androstene-3,17-dione, followed by pyrolysis of this compound under reduced pressure to obtain 4,6-androstadiene-3,17-dione and then hydrogenation of this product by one mole of hydrogen in the presence of a charcoal-palladium catalyst, the androgenically active steroid, 4-androstene-3,17-dione is obtained. This compound may be converted to testosterone by the action of fermenting yeast.

In addition, 6β,17α,21-trihydroxy-4-pregnene-3,20-dione and esters thereof demonstrate corticoid, androgenic, progesterone, anabolic, antihypertensive, and anesthetic properties.

Using the procedure set forth in the following examples, the mono- and di-esters of 6β,17α,21-trihydroxy-4-pregnene-3,20-dione are prepared by reacting 6β,17α,21-trihydroxy-4-pregnene-3,20-dione with ketene, ketenes of selected acids, selected acids, acid anhydrides or acid chlorides, in an organic solvent such as pyridine or the like. Representative 21-mono and 6,21 di-esters thus prepared include, among others, one to eight carbon atom carboxylic acid acyloxy esters of saturated or unsaturated, aliphatic or carbocyclic, cycloaliphatic, aryl, arylalkyl, alkaryl, mono-, di- or polycarboxylic acids which form ester groups such as, for example, formoyloxy, acetoxy, propionyloxy, butyryloxy, valeryloxy, hexanoyloxy, heptanoyloxy, octanoyloxy, benzoxy, phenylacetoxy, toluoyloxy, naphthoyloxy, cyclopentylformoyloxy, β-cyclopentylpropionyloxy, acrylyloxy, cyclohexylformyloxy, the half and diesters of malonic, maleic, succinic, glutaric and adipic acids, and the like. The acids may also contain non-interfering substituents, such as mono- or poly-halo, chloro, bromo, hydroxy, methoxy, and the like, if desired.

The starting material in these acylating reactions, 6β,17α,21-trihydroxy-4-pregnene-3,20-dione, may be prepared by subjecting 11-desoxy-17-hydroxycorticosterone to the action of a fungus of the order Mucorales as set forth in the applications of Murray and Peterson, Serial Number 180,496, filed August 19, 1950, now abandoned, Serial Number 272,944, filed February 23, 1952, issued on July 8, 1952 as United States Patent 2,602,769, and Serial Number 293,657, filed June 14, 1952, of which this application is a continuation-in-part.

The following preparation and examples are illustrative of the objects, processes and products of the present invention, but are not to be construed as limiting.

*Example 1.—6β,17α,21-trihydroxy-4-pregnene-3,20-dione*

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Two liters of this sterilized medium was inoculated with *Rhizopus arrhizus*, ATCC 11145, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24-hour growth of *Rhizopus arrhizus* was added one gram of 11- desoxy-17-hydroxycorticosterone in 25 milliliters of acetone to provide a suspension of the steroid in the culture. After an additional 42-hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts, including solvent, were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenths by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The residue was dissolved in a minimum of methylene chloride, filtered and the solvent was then evaporated in air or on a steam bath. The resulting crude crystals were dried and then washed five times with five-milliliter portions of ether per gram of crude crystals weighing 1.834 grams. Extraction of the crystals with three portions, five milliliters each, of ice cold methylene chloride yielded 525 milligrams of crystals melting at 198 to 207 degrees centigrade. Recrystallization from a mixture of thirteen milliliters of methanol and one milliliter of water produced 305 milligrams of crystals, melting at 224 to 228 degrees centigrade. Recrystallization from methanol of 35 milligrams yielded 26 milligrams of crystals, 6$\beta$,17$\alpha$,21-trihydroxy-4-pregnene-3,20-dione, melting at 224 to 227 degrees centigrade, having an optical rotation of $[\alpha]_D^{25}$ of plus 58.5 degrees (0.894 in 95 percent ethanol). Infrared microcombustion and acetylation indicated the addition of one hydroxyl group.

Analysis: Calculated for $C_{21}H_{30}O_5$: C, 69.58; H, 8.35. Found: C, 69.66; H, 8.22.

The identical procedure using organism *Rhizopus nigricans* minus strain ATCC 6227b instead of *Rhizopus arrhizus* similarly produced compound 6$\beta$,17$\alpha$,21-trihydroxy-4-pregnene-3,20-dione from compound S, 11-desoxy-17-hydroxycorticosterone.

Example 2.—6$\beta$,17$\alpha$-Dihydroxy-21-acetoxy-4-pregnene-3,20-dione

A solution containing 0.031 milliliter of redistilled acetic anhydride dissolved in two milliliters of pyridine was added to a solution containing 100 milligrams of 6$\beta$,17$\alpha$,21-trihydroxy-4-pregnene-3,20-dione dissolved in one milliliter of pyridine. After allowing the mixture to stand at room temperature for sixteen hours, forty milliliters of water was added thereto. Within a short time, crystals began to form. The reaction mixture was then refrigerated for three hours, centrifuged, washed with water and dried under vacuum. A yield was obtained of 49.5 milligrams of crystalline 6$\beta$,17$\alpha$-dihydroxy-21-acetoxy-4-pregnene-3,20-dione, melting at 246 to 260 degrees centigrade. Infrared analysis verified this compound as the 21-acetate since there is a 1:1:1 ratio of acetate: normal ketone: conjugated ketone. Recrystallization from 2.8 milliliters of methanol yielded twenty milligrams of the purified compound melting at 256 to 265 degrees centigrade.

Example 3.—6$\alpha$, 21 - diacetoxy, 17$\alpha$ - hydroxy - 4-pregnene-3,20-dione A sample of 51.1 milligrams of 6$\beta$,17$\alpha$,21-trihydroxy-4-pregnene-3,20-dione was dissolved in four milliliters of acetic anhydride and two milliliters of pyridine. The solution was warmed for a short time on a steam bath to dissolve the crystals completely. After maintaining the mixture for fifteen hours at room temperature, it was diluted with thirty milliliters of ice water and extracted twice with thirty milliliter portions of a mixture of five parts of ether to one part of methylene chloride. The combined extracts were washed twice with ten milliliter portions of 2 N hydrochloric acid, once with a ten milliliter portion of water, three times with ten milliliter portions of seven percent sodium bicarbonate, three times with ten milliliter portions of water and the solvents dried over anhydrous sodium sulfate. After removal of the solvents in vacuo, 58.5 milligrams of crystalline residue remained. Recrystallization from five milliliters of acetone by the dropwise addition of ether yielded 34 milligrams of crystalline 6$\beta$,21-diacetoxy,17$\alpha$-hydroxy-4 - pregnene - 3,20 - dione melting at 192 to 195 degrees centigrade, $[\alpha]_D^{23}$ of plus 63 degrees (0.9852 in chloroform).

Analysis: Percent calculated for $C_{25}H_{34}O_7$: C, 67.24; H, 7.67. Found: C, 67.30; H, 7.68.

Although the acylation processes illustrated by Examples 1 and 2 produce both the mono-esters and the di-esters, the proportions of the esters obtained in this manner depend upon the proportions of acylating agent to 6$\beta$,17$\alpha$,21-trihydroxy-4-pregnene-3,20-dione. By using one mol of 6$\beta$,17$\alpha$,21 - trihydroxy - 4 - pregnene-3,20-dione with about one mol or equivalent of acylating agent, the mono-acylated compound is the predominant product while with the use of about two mols or equivalents of acylating agent, the diacylated compound is the predominant product.

Example 4.—6$\beta$,17$\alpha$-dihydroxy,21 - formyloxy-4-pregnene-3,20-dione A mixture of 0.5 gram of 6$\beta$,17$\alpha$,21-trihydroxy-4-pregnene-3,20-dione in ten milliliters of 87 percent formic acid was heated for two hours at 75 degrees centigrade. Upon the addition of water, crystals of 6$\beta$,17$\alpha$-dihydroxy,21-formyloxy-4-pregnene-3,20-dione were formed and were then separated by filtration.

Example 5.—6$\beta$,21-diformyloxy-17$\alpha$-hydroxy-4-pregnene-3,20-dione

Following the procedure of Example 4 and using a solution containing 0.5 gram of 6$\beta$,17$\alpha$,21-trihydroxy-4-pregnene-3,20-dione dissolved in twenty milliliters of formic acid, crystals of 6$\beta$,21 - diformloxy - 17$\alpha$ - hydroxy - 4 - pregnene-3,20-dione were produced.

Example 6.—6$\beta$,17$\alpha$-dihydroxy-21 - propionyloxy-4-pregnene-3,20-dione Following the procedure of Example 2 and using an equivalent proportion of propionic anhydride in place of acetic anhydride, crystals of 6$\beta$,17$\alpha$-dihydroxy-21-propionyloxy - 4 - pregnene-3,20-dione were produced.

Example 7.—6β,21-dipropionyloxy-17α-hydroxy-4-pregnene-3,20-dione

Following the procedure of Example 3 and using an equivalent proportion of propionic anhydride in place of acetic anhydride, 6β,21-dipropionyloxy-17α-hydroxy-4-pregnene-3,20-dione was produced.

Example 8.—6β,17α-dihydroxy-21-benzoxy-4-pregnene-3,20-dione

To a solution containing 0.2 gram of 6β,17α,21-trihydroxy-4-pregnene-3,20-dione dissolved in eight milliliters of benzene was added 0.4 milliliter of freshly dried and redistilled pyridine and 0.2 milliliter of freshly distilled benzoyl chloride and the mixture was maintained at room temperature for twenty hours. The reaction mixture was then diluted with fifty milliliters of ether, washed successively with water, ten percent aqueous sodium hydroxide solution, and again with water, dried over anhydrous sodium sulfate, filtered and then evaporated free of solvent. The residue was mixed with 25 milliliters of water and maintained under reflux for fifteen minutes, cooled, extracted with ether, washed with water followed by a wash with a ten percent sodium hydroxide solution, and again washed with water, dried over anhydrous sodium sulfate, filtered and evaporated to a volume of ten milliliters. After cooling, the resulting crystals were removed by filtration and washed with benzene to yield crystalline 6β,17α-dihydroxy-21-benzoxy-4-pregnene-3,20-dione.

Example 9.—6β,21-dibenzoxy-17α-hydroxy-4-pregnene-3,20-dione

Following the procedure of Example 8 and increasing the quantity of benzoyl chloride to 0.4 milliliter, 6β,21-dibenzoxy-17α-hydroxy-4-pregnene-3,20-dione was produced.

If a mixed ester containing two dissimilar acyl groups is desired, 6β,17α,21-trihydroxy-4-pregnene-3,20-dione may be partially esterified with one acylating agent and the resulting monoester may then be completely esterified with another acylating agent which introduces a different acyl group.

It is to be understood that the invention is not to be limited to the exact details of operation or exact compounds shown and described herein, as obvious modifications and equivalents will be apparent to one skilled in the art, and the invention is therefore to be limited only by the scope of the appended claims.

We claim:

1. A compound selected from the group consisting of 6β,17α,21-trihydroxy-4-pregnene-3,20-dione and 6β,17α,21-trihydroxy-4-pregnene-3,20-dione esters of hydrocarbon carboxylic acid containing less than nine carbon atoms.

2. 6β,17α,21-trihydroxy-4-pregnene-3,20-dione.

3. 6β,17α,21-trihydroxy-4-pregnene-3,20-dione esters of hydrocarbon carboxylic acid containing less than nine carbon atoms.

4. 6β,17α-dihydroxy-21-acetoxy-4-pregnene-3,20-dione.

5. 6β,21-diacetoxy-17α-hydroxy-4-pregnene-3,20-dione.

6. 6β,17α-dihydroxy-21-propionyloxy-4-pregnene-3,20-dione.

7. 6β,21-dipropionyloxy-17α-hydroxy-4-pregnene-3,20-dione.

8. A process for the preparation of esters of 6β,17α,21-trihydroxy-4-pregnene-3,20-diones which comprises reacting 6β,17α,21-trihydroxy-4-pregnene-3,20-diones with an acylating agent to produce esters of 6β,17α,21-trihydroxy-4-pregnene-3,20-diones.

9. A process for the preparation of esters of 6β,17α,21-trihydroxy-4-pregnene-3,20-dione which comprises reacting 6β,17α,21-trihydroxy-4-pregnene-3,20-diones with a carboxylic acid to produce esters of 6β,17α,21-trihydroxy-4-pregnene-3,20-diones.

10. A process for the preparation of esters of 6β,17α,21-trihydroxy-4-pregnene-3,20-diones which comprises reacting 6β,17α,21-trihydroxy-4-pregnene-3,20-diones with a carboxylic acid anhydride to produce esters of 6β,17α,21-trihydroxy-4-pregnene-3,20-diones.

11. A process for the preparation of esters of 6β,17α,21-trihydroxy-4-pregnene-3,20-diones which comprises reacting 6β,17α,21-trihydroxy-4-pregnene-3,20-diones with a carboxylic acid halide to produce esters of 6β,17α,21-trihydroxy-4-pregnene-3,20-diones.

12. A process for the preparation of 6β,17α-dihydroxy-21-acyloxy-4-pregnene-3,20-diones which comprises reacting equivalent amounts of 6β,17α,21-trihydroxy-4-pregnene-3,20-diones with an acylating agent to produce 6β,17α-dihydroxy-21-acyloxy-4-pregnenes.

13. A process for the preparation of 6β,21-diacyloxy-17α-hydroxy-4-pregnene-3,20-diones which comprises reacting 6β,17α,21-trihydroxy-4-pregnene-3,20-diones with an acylating agent in a ratio of about one mol to about two mols, respectively, to produce 6β,21-diacyloxy-17α-hydroxy-4-pregnene-3,20-diones.

14. A process for the preparation of 6β,17α-dihydroxy-21-acetoxy-4-pregnene-3,20-dione which comprises reacting equivalent amounts of 6β,17α,21-trihydroxy-4-pregnene-3,20-dione with acetic anhydride to produce 6β,17α-dihydroxy-21-acetoxy-4-pregnene-3,20-dione.

15. A process for the preparation of 6β,21-diacetoxy-17α-hydroxy-4-pregnene-3,20-dione which comprises reacting 6β,17α,21-trihydroxy-4-pregnene-3,20-dione with acetic anhydride in a ratio of about one mol to about two mols, respectively, to produce 6β,21-diacetoxy-17α-4-pregnene-3,20-dione.

HERBERT C. MURRAY.
DUREY H. PETERSON.

References Cited in the file of this patent

UNITED STATES PATENTS

| Number | Name | Date |
|---|---|---|
| 2,337,564 | Marker | Dec. 28, 1943 |
| 2,352,848 | Marker | July 4, 1944 |
| 2,366,204 | Marker | Jan. 2, 1945 |
| 2,423,517 | Reichstein | July 8, 1947 |